Aug. 22, 1944.  F. P. DAVIS  2,356,306
PUMP CONTROL MECHANISM
Filed Dec. 23, 1940
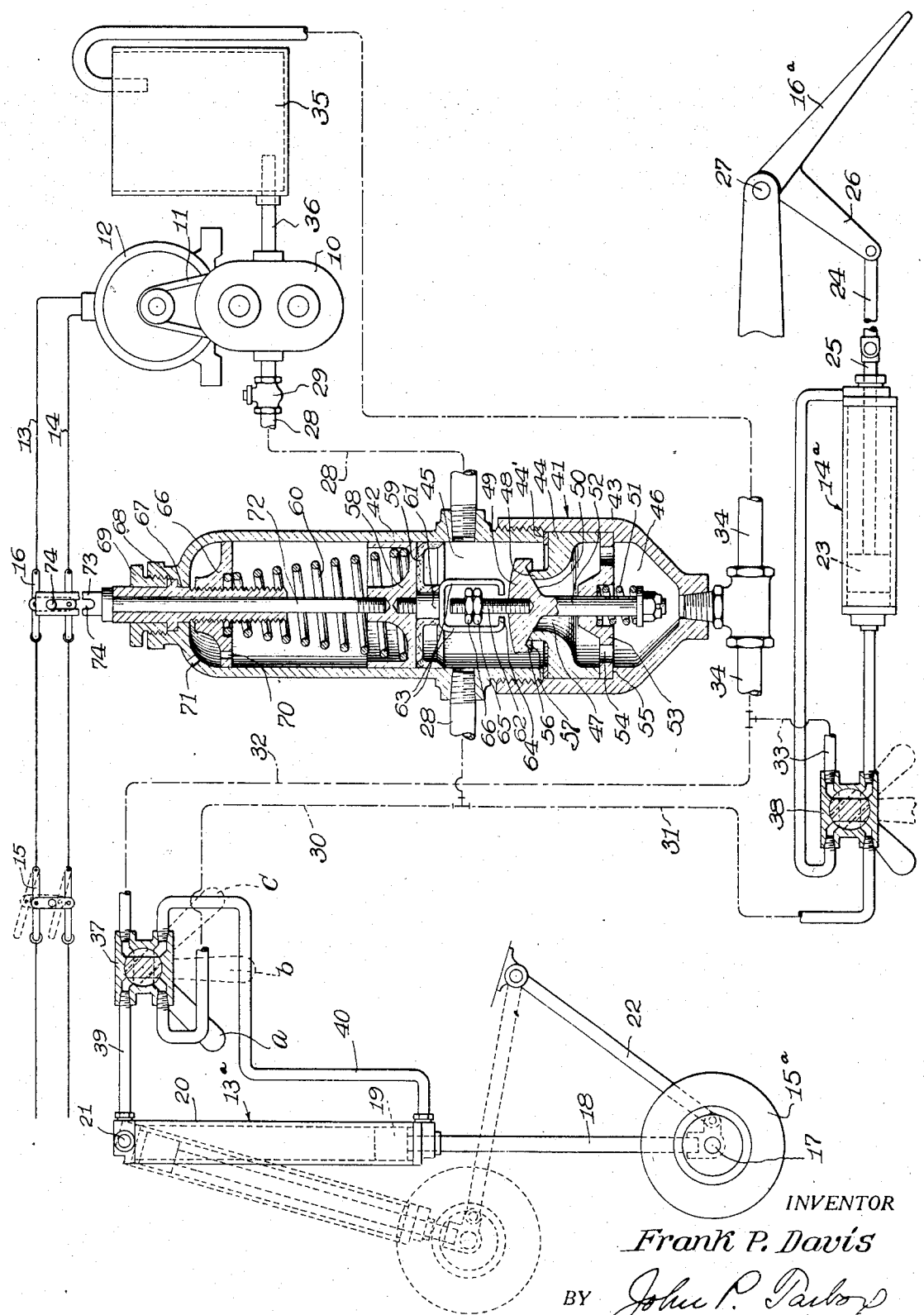
INVENTOR
*Frank P. Davis*
BY *John P. Parks*
ATTORNEY Patented Aug. 22, 1944

2,356,306

UNITED STATES PATENT OFFICE 2,356,306

PUMP CONTROL MECHANISM

Frank P. Davis, Hialeah, Fla.

Application December 23, 1940, Serial No. 371,345

9 Claims. (Cl. 103—25)

My invention has to do with a closed fluid system subject to undesirable pressure build-up and relates more particularly to a method of and means for automatically avoiding in the system such undesirable pressure build-up.

One such system is utilized for operating the landing gear of airplanes, either retractile wheels or landing flaps or both.

A very commonly used such system is one operating the landing gear by hydraulic servo-motors of the cylinder and piston type which are supplied with hydraulic pressure through an electrically driven gear pump.

Such systems are operated under high pressure, such as from 200 to 1000 pounds or over. This pressure is supplied from a constant speed, and, therefore, constant volume gear pump or the equivalent driven by a constant speed electric motor controlled with power from source lines by way of a manual control switch and an automatic cut-out switch. The constant volume supply from the pump is conducted to the servo-motors through a delivery line and returned from them by a return line, the latter extending to a supply reservoir from which the pump draws its oil by a suction line. Delivery and return are by way of selector valves having three positions, respectively defining extension, cut-off and retraction of the motors. In the extension position the pump delivery line is connected to one end of the motor cylinder, while in the retraction position it is connected with the other end, these connections serving alternately as return connections when the valve is respectively in the extension or retraction positions.

It has been found that in the operation of such systems, due to changing leverages and gravity conditions and other causes, the pressure in the servo-motor cylinders may vary as much as three or four hundred pounds and there may result very sudden build-up due to variations in the imposed load. This is especially true in connection with landing gear.

In all cases when the pistons of the servo-motors reach the extreme end of their stroke, a shock occurs followed by sudden build-up from a normal maximum, say, of 500 pounds to an abnormal degree of say 700 pounds, or even 1000, or more. This happens in spite of the common use in such systems of a pressure operated diaphragm cut-out switch cutting off the power source lines to the pump driving motor. This is because the inertia of the rapidly rotating motor and the gears of the gear pump are not immediately overcome, and the delivery of but a small excess volume into the system before the inertia movement is complete, may shoot the pressure to unwanted heights, such as may result in breakage of the lines and/or servo-motors. The same undesirable conditions may occur before the pistons of the motor reach the end of their stroke, if their motion should be suddenly arrested due to unusual resistance encountered, such as if the landing gear should stick or be retarded for some other cause.

The outstanding object of my invention is the evolution of an improved such system and/or method of operation which shall be free from liabilities to stalling or stoppage intermediate stroke limits and free from dangers of damage due to the development of undue pressures at any stage of the operation, and yet which shall function positively both during movements and at the limits of the stroke of the servo-motors.

This object is attained outstandingly by the connection directly or indirectly in the delivery and return lines of the system, of a combined energy storing device or surge absorber and pressure regulator which limits the pressure in the system below a predetermined level, and if the pressure should surge momentarily for some reason above this predetermined level, provides for the automatic cut-out of the pump motor to prevent destructively high pressure such as might result in breakage of the lines, etc. The device is so constructed and arranged that, after a predetermined high level of pressure has been attained, a relief valve is opened from the delivery to the return side of the system, and if the resistance to movement of the piston of the motor persists, the pressure will be maintained with very little variation from this level. The object and other and further objects and the manner in which they are attained will become clear from the following detailed description when read in connection with the drawing forming a part hereof.

In the drawing, the figure shows the system more or less diagrammatically as applied to hydraulic servo-motors for moving a landing wheel and/or a landing wing flap to operative and inoperative positions.

In this figure, the constant volume gear pump is indicated at 10. It is shown driven by suitable pulleys and a belt 11 from the constant speed electric motor 12 supplied with power from a suitable source by the lines 13 and 14. While a belt drive is shown, obviously the usual geared drive may be utilized. The supply lines 13 and 14 are controlled by a manual switch 15 and an automatic switch 16, the throwing of either of which to inoperative position, as shown in dotted lines in connection with switch 15, cuts off the power from the motor 12.

The constant volume supply from the pump 10 is conducted to the servo-motors, two of which 13a and 14a are shown, connected in the system. Both are shown as being reciprocating piston and cylinder motors, the one 13a being connected to operate a landing wheel 15a and the other 14a, a landing flap 16a, but it will be understood that the invention in its broad aspects, is not limited to the particular device or devices which the servo-motors operate. The landing wheel 15a may be connected through its axle 17 by a strut 18 which may (as shown) be the piston rod, to the piston 19 of the servo-motor 13a and one end of the cylinder 20 of the motor 13a may be pivotally connected at 21 to the frame of the machine. The axle 17 may be further connected to the frame of the machine by a link 22 pivoted at its ends to the axle and frame respectively. When the piston is at the lower end of its stroke, the wheel is extended for landing, as shown in full lines, and when the piston is at the upper end of its stroke, the wheel is retracted, as shown in dotted lines.

Similarly, the piston 23 of the motor 14a may be connected to the wing flap 16a by a link 24 pivoted, respectively, to the piston rod 25 and an arm 26 extending from the flap adjacent its pivotal connection 27 to the machine. When the piston is retracted, as shown, to the left-hand end of the cylinder, the flap 16a is depressed to the landing position, and when the piston is at the opposite end of the cylinder, the flap is raised to the normal flying position.

Both servo-motors are connected into the system in substantially the same way by delivery and return lines in the manner now to be described.

The constant volume supply from the pump 10 is conducted through a delivery line 28 supplied with a check valve 29 through branches 30 and 31 to the respective servo-motors 13a and 14a, and the fluid is returned from the motors, respectively, by branches 32 and 33 uniting into return line 34 discharging into the supply reservoir 35 from which the fluid is drawn by the pump 10 through suction line 36.

Each of the branches 30 and 32 and 31 and 33 of the supply and return lines to the respective servo-motors 13a and 14a is provided with selector valves 37 and 38, respectively, which control the flow of fluid to and from the respective motors.

Since both valves 37 and 38 are identical, only one need be described in detail in connection with its associated servo-motor. Each valve is movable to three positions designated a, b and c. When valve 37 is in position a, the fluid supply line 30 is connected to the upper pivoted end of the cylinder 20 through extension line 39 and return line 32 is connected to the lower end of the cylinder through extension line 40. In this position of the valve the landing wheel is moved to extended position, as shown in full lines. When the valve is turned to position c, the supply line 30 is connected to extension 40 and the return line 32 is connected to extension 39. When the valve is in this position, the landing wheel is moved to retracted position as shown in dotted lines. The valve may be moved to a third or cut-off position, position b, in which the valve ports are all closed, and the piston 19 is locked by the fluid in the position it occupies at the time the valve is turned to this third position, b.

To prevent undesirable build-up of pressure in the system, according to the invention, there is connected into the delivery and return lines 28 and 34 a combined energy storage device, or surge absorber and pressure regulator, designated generally by reference character 41. This device comprises in the main a two-part casing, the parts 42 and 43 of which are screw-threaded together, the screw-threaded connection being rendered fluid tight by a sealing washer 44' clamped between a transverse partition 44 and the end of casing part 42. This transverse partition divides the casing into an upper main expansion energy storage chamber 45 and a lower relief chamber 46. It is provided with a central opening 47 having around it a raised frusto-conical valve seat 48 against which a valve 49 having a similar frusto-conical seat 50 normally seats and thus seals the upper chamber 45 from the lower 46. The valve 49 is held to its seat by the pressure of the fluid in chamber 45 and a spring 51 surrounding its stem 52 and bearing at its ends against a shoulder on the stem 52 and against the bottom of a recess formed in a guiding diaphragm 53 for the valve stem 52, the said diaphragm being provided with a number of holes as 54 affording free communication between its top and bottom faces and being securely clamped in place between a shoulder 55 on casing part 43 and the partition 44. The head of the valve 49 extends beyond the seat 48 and its frusto-conical seat 50 merges in its outer margin with a depending lip 56, the merging face 57 of which is of reverse frusto-conical form. This form of valve and valve seat is advantageous to secure a balanced action and firm seating of the valve, and close regulation of the pressure in the chamber 45.

The chamber 45 immediately above the partition 44 communicates directly with the delivery line 28 and forms in effect an expansion or surge chamber to take care of sudden surges of pressure. Its upper wall is formed by a movable piston 58 sealed by a suitable sealing cup 59 and pressed downwardly by a spring 60, adjustable to permit extended movement of the piston and hence considerable change in the volume of chamber 45. The downward movement of the piston under the action of the spring 60 is limited to prevent cutting off of the inlet and outlet for the line 28 by a stop-collar on piston rod 72 secured centrally to the piston. An extension 61 from the chamber side of the piston has a lost-motion connection with the valve 49 which permits the piston to be raised against the action of the spring 60 under pressure increase or surge in the chamber 45 to a predetermined pressure level without unsealing the valve. If the piston is raised above this level, the lost-motion having been taken up, the valve 49 is lifted off its seat and the chamber 45 is connected to the return line 34, permitting the pressure in chamber 45 to drop.

This lost-motion connection between the valve 49 and the piston 58 may comprise a screw-threaded stem 62 screwed into the valve head and projecting between the forks 63 of a bifurcated portion of extension 61, the ends of these forks being extended inwardly at 64 toward the stem 62, where they may engage under a nut 65 locked in place as by a lock-nut 66 on the stem. The nut 65, being adjustable, enables the extent of the lost-motion between piston and valve to vary within practical limits.

The spring 60 acting on the piston 58 may have its tension adjusted through an adjustable abutment 66 against which its upper end bears. Abutment 66 has a central screw-threaded opening which is engaged by a screw-threaded stem 67 having a collar 68 which holds it against endwise movement between a shoulder on the upper end of the part 42 of the casing and a removable screw-threaded plug 69. The upper end of the stem 67 projects beyond the plug 69 and may be turned, by engaging this projecting end with a suitable tool, to adjust the abutment 66 and consequently the tension of the spring 60. Suitable air vents 70 and 71 may be provided, respectively, in the abutment 66 and in the casing part 42 in the region above the abutment.

To prevent breakage of the lines, etc., if the pressure in the chamber 45 should rise by a sudden surge beyond that normally relieved by the opening of the valve 49, the excessive movement of the piston 58 caused by such surge, may be utilized to operate the automatic switch 16. To this end the piston 58 has its rod 72 extending through a bore in the plug 69 beyond the casing. This rod has a slotted extension 73, forming a lost-motion connection with the stud 74 for operating the switch 16, such lost-motion connection leaving the switch in operative position under all but such excessive pressures as would be likely to break parts of the system. Such excessive pressures would cause the end of the slot 74 in the extension 73 to engage the operating stud to open the switch and stop the motor. When the pressure has dropped sufficiently to allow the return of the piston to the intermediate pressure-level position, the switch is again automatically closed by the engagement of the other end of the slot in the extension 73 with the operating stud 74 to restart the motor 12. It will be understood that the chamber 45 may either have the pressure line of the system, as 28, pass right through it, as shown, or said line may be connected by a branch line or otherwise.

The operation of the device will now be described.

When the pilot wishes to make a landing, assuming the motors for extending the landing wheels and for tipping the landing vanes to the inoperative position are in retracted position, he closes the manual switch 15 thus starting the motor 12 and pump 10 to deliver a constant volume of fluid, such as oil, at a constant speed to the delivery lines of the motors 13ª and 14ª, assuming the selector valves 37 and 38 are in the full line position shown. Fluid is thereby introduced under pressure to the top of the piston, and normally the extension of the wheel and flap will proceed at a pressure of, say, 300 pounds.

However, it may and does happen that the extension of the motors is resisted, perhaps by air pressure or gravity conditions, or otherwise, so that it is desirable that the pressure may rise to overcome this abnormal resistance, say as high as 700 pounds, and be held there without appreciable variation until the extension is completed without attention from the operator. To permit this rise in pressure above the normal without cutting out the motor 12, the expansible energy storing or surge chamber 41, provided in the supply line 28, comes into play.

The pressure of the spring 60 which may be regulated, and the area of the head of the valve 49 exposed to the pressure, determines the height to which the pressure may be built up and the amount of energy stored to continue the application of pressure at this higher predetermined level to the servo-motors.

When the pressure in the chamber exceeds the combined action of the spring 60 and the pressure on the valve, and causes the piston 58 to rise to such an extent as to take up the lost motion between the piston and the valve, the valve 49 is unseated and as soon as it is unseated, the fluid rushing between it and its seat tends to create a balance of pressure on the valve which results in the spring alone opposing the movement of the piston and consequently the valve is further opened, since the spring pressure is no longer opposed by the pressure on top of the valve head. The valve and the opening it controls are so proportioned as to discharge into the relief chamber 46 the fluid at substantially the same or greater rate than it is delivered by the pump. As soon as the pressure drops ever so slightly, say 5 or 10 pounds, the valve is again seated by the energized spring lowering the piston, but if the abnormal resistance to movement of the servo-motor or motors still persists, the pressure will again build up until the valve is unseated, and by-passes some of the fluid from the delivery line.

The shape and proportion of the valve parts and the action of the energy-storing spring thus holds the pressure in the delivery line acting on the motor at a predetermined high point, say 700 pounds, with very little variation from said maximum until the abnormal resistance to movement of the motor is overcome, when motor piston as 19 is moved to the limit of its stroke. Here it comes up against a sudden stop and this may create an excessive surge in the delivery line, forcing the pressure suddenly above the said predetermined high point, say to 1000 pounds, beyond which there might be danger of rupturing parts of the system.

To avoid such damage, the automatic switch 16 comes into play at such higher pressures, the piston rod 72 and its extension 73 operating it to open the motor circuit to stop the motor 12 and pump 10. At the same time the excess pressure is being by-passed through valve 49, and soon drops to permit the piston 58 to move down under the action of the energy storing spring 60, again close the switch and start the motor after the pressure has dropped to say about 700 pounds. Such excessive surge may also sometimes develop during the stroke of the motor, and the energy-storing and regulator device 41 then takes care of the system in the manner already described for surges at the limit of the stroke of the motor.

It will thus be seen that the energy-storing device and pressure regulator 41 acts to protect the system against undue strain or breaking in two ways, first by the opening of the by-pass valve at a predetermined level of pressure, and then if high pressures still are caused for any reason, by the opening of the switch 16 controlling the electric pump driving motor 12. At the same time it permits a very substantial build-up of pressure above the normal and maintains the pressure with but slight variation at this maximum, when undue resistance is met in the stroke of the servo-motor, until such resistance is overcome.

When it is desired to retract the landing wheels 15 and flap 16 to their normal flying position, the selector valves 37 and 38 are merely turned to the retracting position c, and the retraction will proceed in the same manner as the extension above described. If the selector valves are then turned after retraction to the intermediate cut-off position, the servo-motors 13 and 14 will be locked by the fluid in their retracted positions. However, it is to be understood that in the interests of maximum safety it is not intended to rely on this hydraulic lock alone because of the possibility of leakage, but separate means, not shown, may purposely be provided to positively lock the parts in retracted and extended positions. When the selector valves are moved to the cut-off position, the pressure in the high pressure line may, if desired, be by-passed around the valves in any known manner.

Under some conditions, if a hydraulic system for retracting and extending landing gears is left under pressure, the pressure may build up to a dangerous high, which the use of my combined energy-storage device in connection with the system is designed to avoid. It permits such high pressure to be bled down without retracting or extending the landing gear, as the case may be. Heretofore, it has been a drawback to such systems where a selector valve alone was used to bleed down such undesirable high pressures when the landing gear was extended, that the retraction of the landing gear has almost invariably resulted. To avoid this it became necessary to use auxiliary safety devices, such as safety blocks, hooks or cables to keep the gear from retracting while bleeding down. Such auxiliary devices become unnecessary in the use of my device, since the pressure in the system can bleed down only to the operating pressure for which the device is set.

The method of the invention is capable of being carried out by various mechanisms and systems, and I do not wish to be limited to the specific embodiment shown and described, but consider as falling within the scope of the invention all such changes and modifications as fall within the spirit and scope of the appended claims.

What is claimed is:

1. In fluid pressure circuits, the improvement in control means for modifying the pressures in said circuits, said control means comprising a chamber connected to said circuits, an inwardly movable valve forming an outlet from said chamber, and a piston freely movable in said chamber and operably connected to said valve, said valve being retained in position by both fluid and spring pressure.

2. In fluid pressure circuits including a pump, the improvement in control means for modifying the pressures in said circuits, said control means comprising a tubular chamber, a valve controlling an outlet in said chamber and connected to the return circuit of said pump, said valve outlet having an inner annular flange forming a valve seat on which said valve is positioned, said valve having a relatively large head with a flattened inner surface and a conical outer surface, the conical surface converging into an outwardly extending support rod, and diverging to a point adjacent the circumference of the head beyond the valve seat in a reversely inclined frustro-conical surface, a piston movable in said chamber, yieldable means for positioning the piston at one limit of its movement, and connecting means between said piston and valve head.

3. In fluid pressure circuits including a pump, the improvement in control means for modifying the pressures in said circuits, said control means comprising a tubular chamber, a valve controlling an outlet in said chamber and connected to the return circuit of said pump, said valve outlet having an inner annular flange forming a valve seat on which said valve is positioned, said valve having a relatively large head with a flattened inner surface and a conical outer surface, the conical surface terminating at its vertex in an outwardly extending support rod, and at its base adjacent the circumference of the valve head at a point beyond the valve seat in a reversely inclined frustro-conical surface, spring means connected to said valve rod for maintaining pressure of the valve head on the valve seat, a piston movable in said chamber, spring means for holding said piston normally adjacent said valve, and connecting means between the valve and piston.

4. A fluid pressure system comprising a pump, motor means for operating said pump, power means for operating said motor means, fluid receiving circuits connected to said pump, and control means for modifying the pressures in said circuits, said control means comprising a tubular chamber having an outlet valve seat therein, a spring held valve normally engaging said valve seat and closing said outlet, a piston movable in said chamber, means for directly connecting the piston to the valve, a piston rod attached to said piston and movable through the chamber wall to a point external thereof, spring means for normally maintaining the piston at one limit of its movement, and means connected to the external end of said piston rod for disconnecting said power means from said motor means.

5. A fluid pressure system comprising a pump, circuits connected thereto, and controlling means including a chamber connected to inlet and outlet conduits of said circuits, a spring controlled piston movable in said chamber, a piston rod connected to the piston and extending through said chamber to an outside point thereof, a valve seat opening within the chamber and connecting to said outlet conduit, a spring held valve normally positioned on said valve seat, lost motion connections between the valve and piston, and lost motion connecting means between the piston rod and the pump operating means.

6. In fluid pressure circuits, the improvement in control means for modifying the pressures in said circuits, said control means comprising a chamber connected to said circuits, an inwardly movable valve forming an outlet from said chamber and said circuits, a piston having a lost motion connection within said chamber to said valve and freely movable in said chamber, and a spring attached to and permitting extended movement of said piston for moving said valve, said valve normally opening against the pressure of fluid in said chamber.

7. In fluid pressure circuits, the improvement in control means for modifying the pressures in said circuits, said control means comprising a chamber connected to said circuits, an inwardly movable valve forming an outlet from said chamber, a spring normally urging said valve outwardly, and a piston freely movable in said chamber operably connected to said valve, said valve being retained in position by both fluid and spring pressure.

8. In fluid pressure circuits, the improvement in control means for modifying the pressures in said circuits, said control means comprising a chamber connected to said circuits and provided with a piston cylinder; a valve in said chamber forming an outlet thereof, a piston movable in said piston cylinder, a lost motion connection directly connecting said valve and piston within said chamber, the axes of movement of the valve and piston being identical.

9. A fluid pressure system comprising a pump, fluid inlet and return circuits connected to said pump, and control means for modifying the pressures in said circuits, said control means comprising a tubular chamber, a valve controlling an outlet in said chamber and connected to the return circuit of said pump, said valve outlet having an inner annular flange forming a valve seat on which said valve is positioned, said valve having a relatively large head with a flattened inner surface and a conical outer surface, the conical surface terminating at its vertex in an outwardly extending support rod, and at its base adjacent the circumference of the valve head at a point beyond the valve seat in a reversely inclined frustro-conical surface, spring means connected to said valve support rod for maintaining pressure of the valve head on the valve seat, a piston movable in said chamber, spring means for holding said piston normally adjacent said valve, and connecting means between the valve and piston, said piston having a fluid contacting area greater than that of the valve.

FRANK P. DAVIS.